Feb. 6, 1968 W. J. ZITKUS 3,367,761
APPARATUS FOR HOMOGENIZING MOLTEN GLASS
Filed Nov. 12, 1964 2 Sheets-Sheet 1
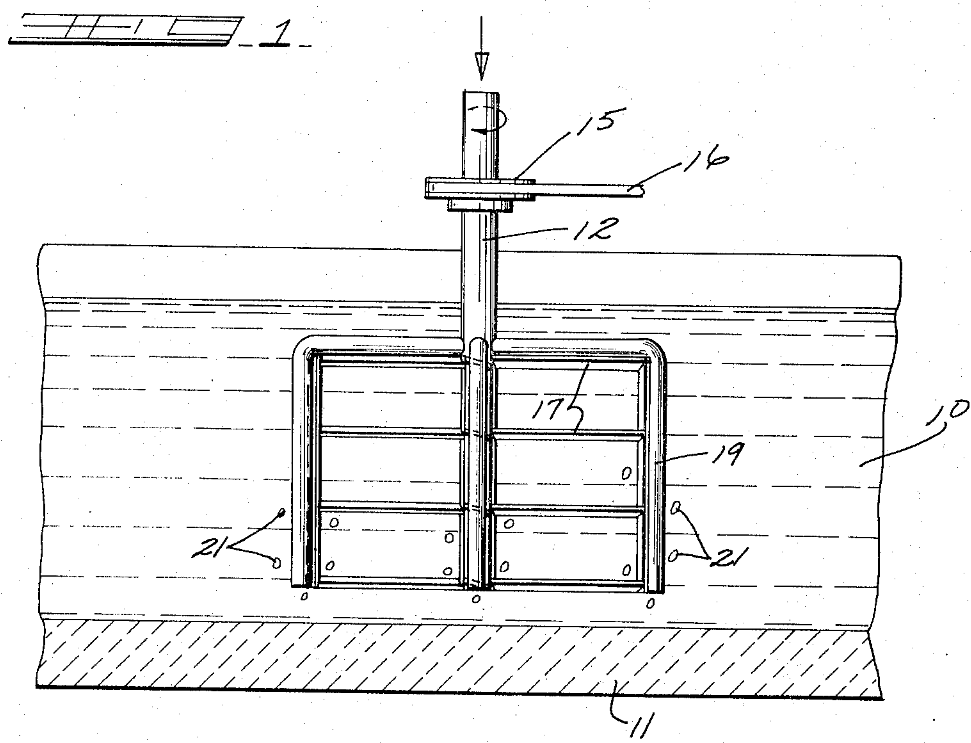
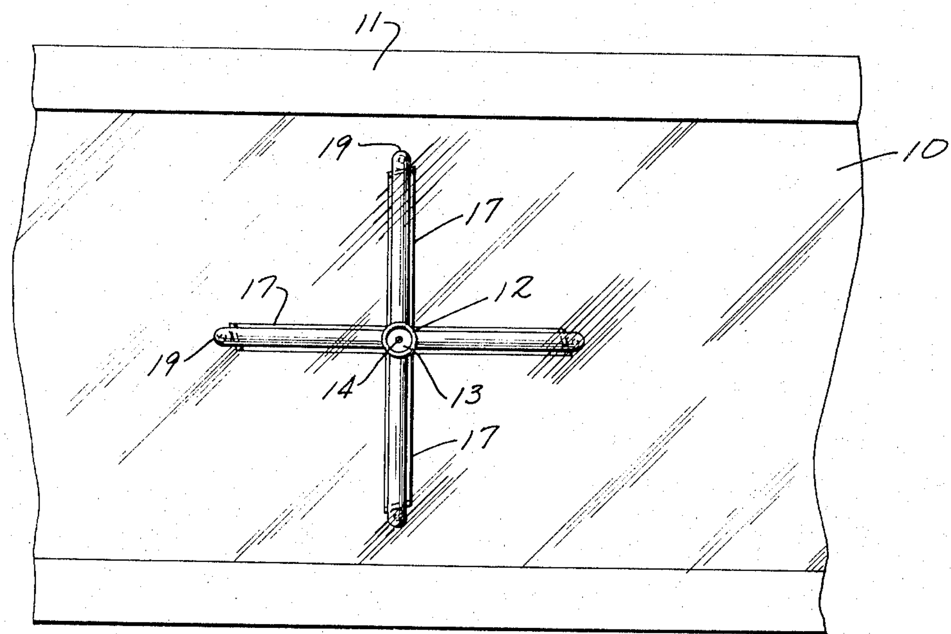
FIG. 2
INVENTOR.
WAYNE J. ZITKUS
BY J. R. Nelson and W. A. Schaich
ATTORNEYS

APPARATUS FOR HOMOGENIZING MOLTEN GLASS

Filed Nov. 12, 1964 2 Sheets-Sheet 2

INVENTOR.
WAYNE J. ZITKUS
BY
J. R. Nelson and
W. A. Schaich
ATTORNEYS

United States Patent Office 3,367,761

Patented Feb. 6, 1968

3,367,761
APPARATUS FOR HOMOGENIZING MOLTEN GLASS

Wayne J. Zitkus, Toledo, Ohio, assignor to Owens-Illinois Inc., a corporation of Ohio Filed Nov. 12, 1964, Ser. No. 410,593
4 Claims. (Cl. 65—178)

ABSTRACT OF THE DISCLOSURE

My invention is an apparatus wherein glass is urged downwardly by mechanical means in a generally circular path while streams of gas are directed downwardly beneath the mechanically agitated portion of the glass to create upwardly rising bubbles, the apparatus comprising a stirrer rotating on a vertical axis and composed of a vertical column with radial angular vanes together with gas conduits extending along some of the vanes and directed downwardly at the free end of each vane, there being an outlet aperture for gas at the lower end of each conduit.

My invention is a novel method of and apparatus for homogenizing molten glass.

An important object of my invention is the provision of a method and apparatus utilizing both mechanical stirring and air or gas bubbling in effecting an unusual degree of molten glass homogenization.

Another object of my invention is the provision of a novel stirrer and bubbler device which both agitates the glass mechanically and introduces gas or air as streams to aid the stirrer in thoroughly mixing the glass.

It is also an object of my invention to provide a mechanical stirrer which tends to move glass in a generally downward direction and introduce streams of gas or air in such fashion as to create rising bubbles moving portions of the glass in an upward direction, thereby to effect exceptionally thorough mixing of the glass.

Other objects will become apparent hereinafter.

In the accompanying drawings:

FIG. 1 is a fragmentary sectional elevational view showing my stirrer and bubbler immersed in a body of molten glass.

FIG. 2 is a top plan view.

Figure 3:
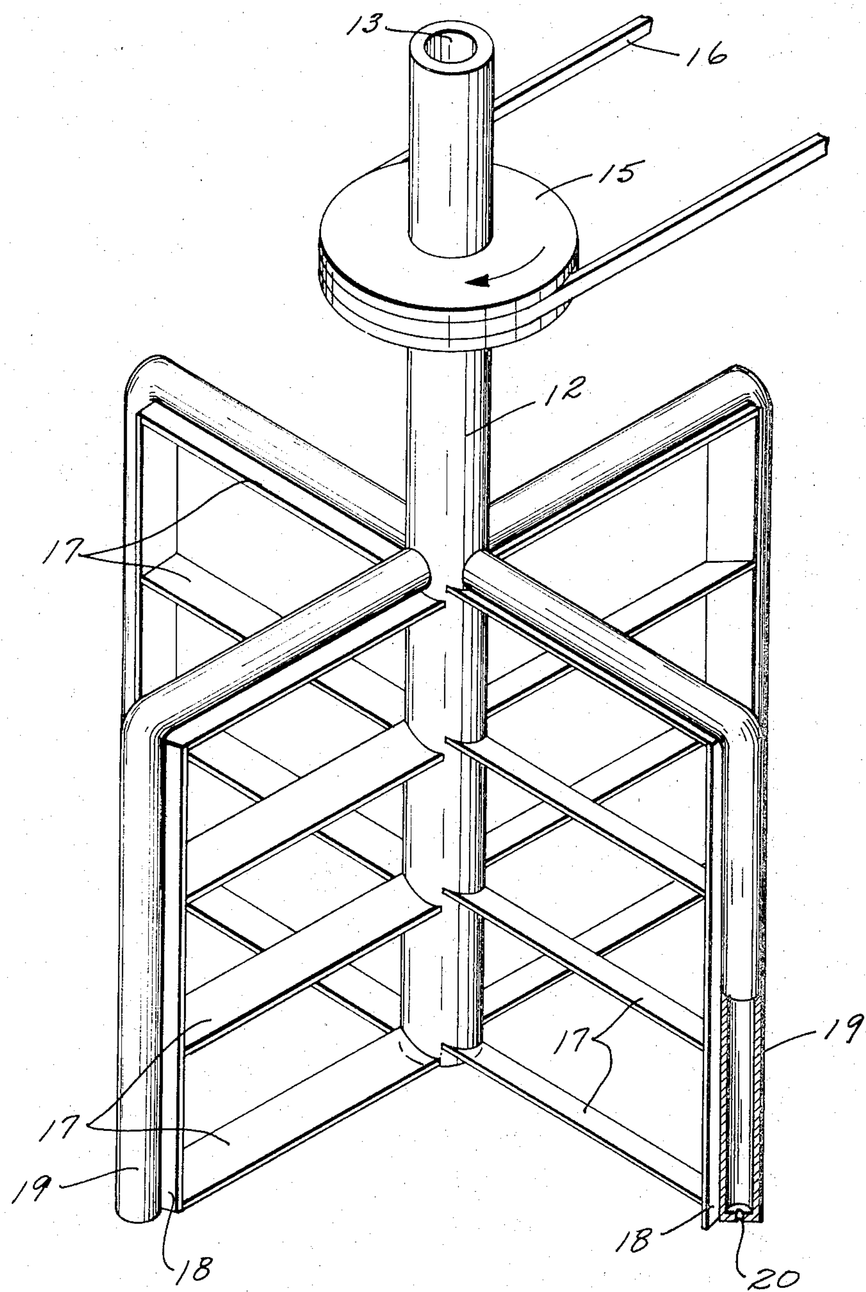
FIG. 3 is a perspective view of the stirrer and bubbler device.

In an effort to produce homogeneous glass, many methods and devices have been utilized, including mechanical stirring, fritting the melted glass in water and bubbling, which involves the introduction of air or gas into the mass of molten glass. My invention provides a stirrer which mechanically moves the glass downwardly and in a somewhat generally circular path and combines with the stirrer, gas, or air conduits which inject small streams of such gas into the mass of glass in a direction opposite that in which the glass is being urged to move by the stirrer itself. Thus I have succeeded in effecting thorough homogenization of the glass, to the end that it may produce better quality ware. It is understood, of course, that these streams of gas or air become rising bubbles in the molten glass.

In the illustrated embodiment of my invention, it is shown immersed in a mass of molten glass 10 contained in a conventional glass melting furnace 11. The specific device is a combined stirrer and bubbler and it comprises a central vertical column 12 having an axial gas or air conducting passageway 13 therethrough which at its lower end may be closed except for a small discharge aperture 14. The upper end of this passageway is intended to be connected to a source of air or gas supply (not shown). The air or gas, as to type, will depend upon the specific composition of the mass of glass being melted, for example, oxygen would be used with melts susceptible to reducing. As will be apparent, this column carries a sheave 15 at its upper end to accommodate a driving belt 16 for effecting rotation of the column and elements carried by it.

These elements include several axially spaced apart annular series of radial impeller vanes 17 which are relatively flat elongated strips so positioned angularly that with rotation of the column in one direction, these vanes urge the glass in a downward direction. The sets of vanes may vary in number as conditions warrant. The free ends of these vanes 17 are interconnected by vertical blades 18, these being angularly positioned to move surrounding glass into the zone of influence of the impeller vanes. Thus with rotation of the stirrer, glass is drawn in toward the column and then urged downwardly by the vanes.

Additionally, I bubble the glass in this same general zone by introducing streams of gas at 5 to 10 p.s.i. and initially move such air streams downwardly beneath the stirrer. For this purpose I utilize pipes or conduits 19, each being inverted L-shape and mounted so that they overlie the upper radial vanes 17 and abut the exterior surface of the vertical blades 18. Each of these conduits 19 is connected to the hollow central column to receive gas or air. At its lower end each of these conduits is closed except for a small discharge aperture 20. Through these apertures the streams of gas make their exit and create rising bubbles 21 (FIG. 1) which aid materially in homogenizing the glass.

Modifications may be resorted to within the spirit and scope of the appended claims.

I claim:

1. In combination, a furnace containing a mass of molten glass, and means for homogenizing the glass comprising a mechanical stirrer, means for driving the stirrer, means embodied in the stirrer for conducting streams of gas to areas of the glass beneath the stirrer and means for directing gas to the stream conducting means, the stirrer comprising a rotating vertical central column, a plurality of radial impeller vanes on said column angled to cause downward movement of the glass incident to rotation of the column in one direction, the stirrer driving means rotating the vanes in a direction to urge the glass downwardly and gas conducting conduits associated with said vanes mounted on the column for initially directing streams of gas downwardly in proximity to the vanes, thereby to create a succession of bubbles rising through the glass mass in the area of the rotating impeller vanes.

2. A molten glass stirrer and bubbler comprising a hollow rotatable vertical central column, an annular series of radial impeller vanes mounted on the column, said vanes being angularly positioned to urge glass downwardly incident to rotation of the column in one direction, means for rotating the vanes in a direction to move the glass downwardly and the emitted gas streams producing bubbles in the area of the rotating vanes and a gas stream conduit directed downwardly at the free end of each vane with an outlet aperture at its lower end, the conduits having communication with the interior of the column.

3. In a stirrer and bubbler as defined in claim 2, there being an annular series of the radial vanes at several points spaced apart axially of the column, and vertical angular blades interconnecting the free ends of the radial vanes, the conduits for the gas streams in part extending lengthwise of and being individual to the angular blades.

4. A molten glass stirrer and bubbler comprising a vertical central column, axially spaced apart annular series of radial vanes on the column, each vane being angularly positioned to function as an impeller, means for rotating the column in a direction such that the vanes push the glass downwardly, a vertical angularly positioned blade interconnecting the free ends of aligned vanes, a gas conduit pipe extending alongside each blade, the column having an axial passage for connection at its upper end to a source of supply of gas, and means connecting each said conduit to the axial passage, said conduits each having a discharge aperture for gas at its lower end whereby to create bubbles in the area of the rotating vanes.

References Cited

UNITED STATES PATENTS

| | | | |
|---|---|---|---|
| 2,261,034 | 10/1941 | McAlpine | 65—178 |
| 3,057,175 | 10/1962 | Rough et al. | 65—178 |
| 3,236,618 | 2/1966 | Allman | 65—134 X |
| 3,239,324 | 3/1966 | Monks | 65—134 |

DONALL H. SYLVESTER, *Primary Examiner.*

FRANK W. MIGA, *Examiner.*